April 5, 1966  B. W. BRACKA ETAL  3,244,384
HIGH LIFT DEVICE ACTUATING MECHANISM
Filed Aug. 7, 1964  4 Sheets-Sheet 1

CLARENCE L. MC LAUGHLIN
BRUNO W. BRACKA
*INVENTORS*

BY *Charles M. Woodward*
ATTORNEY

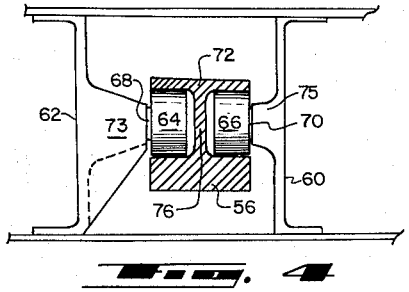
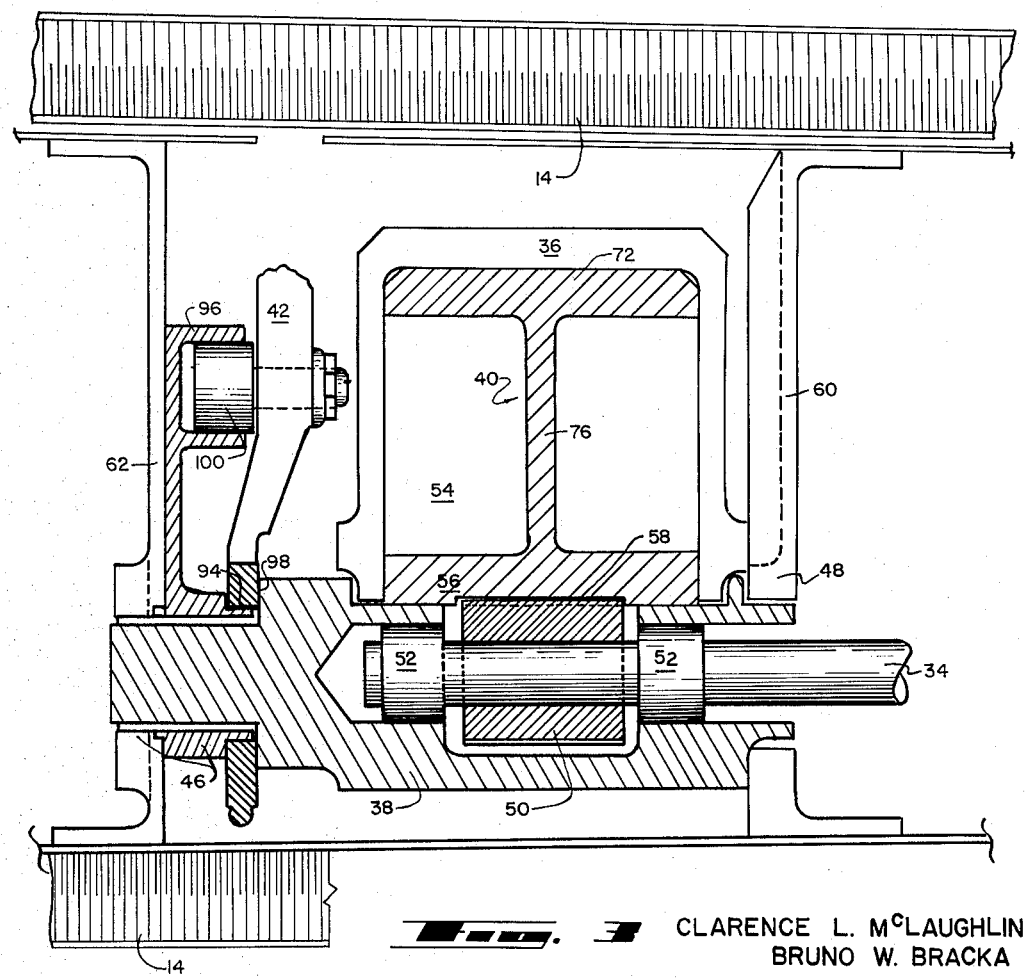

April 5, 1966 B. W. BRACKA ETAL 3,244,384
HIGH LIFT DEVICE ACTUATING MECHANISM
Filed Aug. 7, 1964 4 Sheets-Sheet 3
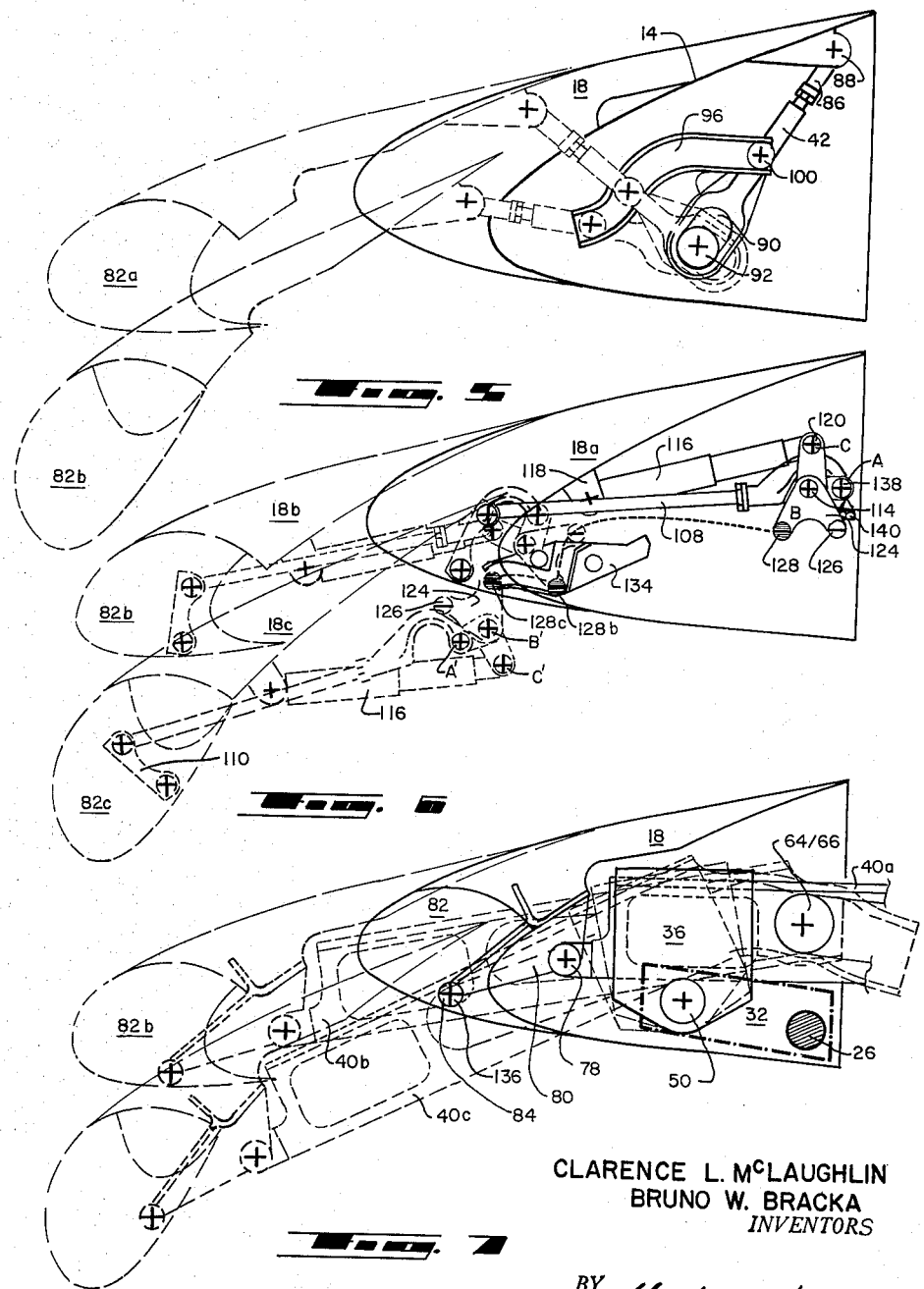
CLARENCE L. McLAUGHLIN
BRUNO W. BRACKA
*INVENTORS*
BY *Charles W. Woodward*
ATTORNEY

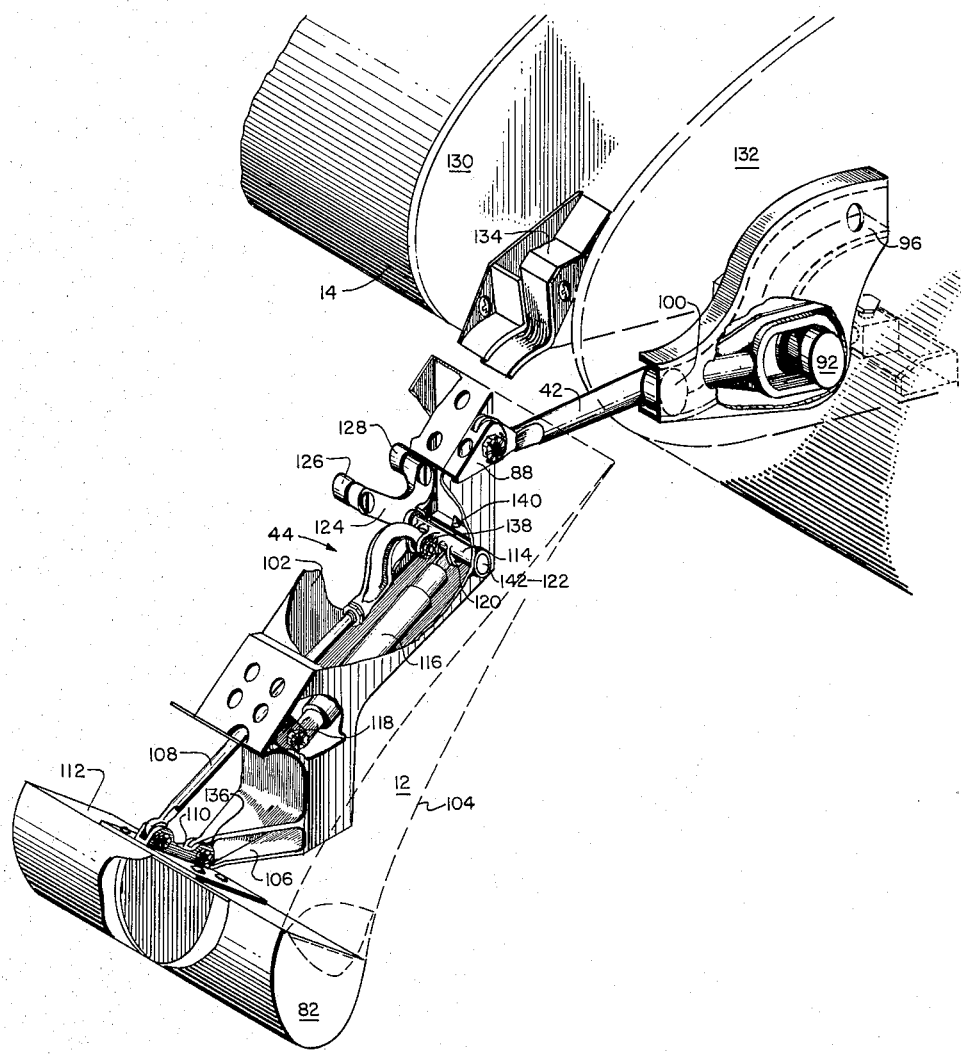

United States Patent Office 3,244,384
Patented Apr. 5, 1966

3,244,384
HIGH LIFT DEVICE ACTUATING MECHANISM
Bruno W. Bracka, La Mesa, and Clarence L. McLaughlin, San Diego, Calif., assignors to General Dynamics Corporation, Fort Worth, Tex., a corporation of Delaware
Filed Aug. 7, 1964, Ser. No. 388,191
3 Claims. (Cl. 244—42)

The present invention relates generally to mechanical actuating devices for association with movable airfoils.

More particularly, the present invention relates to a mechanism which makes feasible the employment of high-lift devices on thin-wing ultrasonic and supersonic aircraft. The invention provides means for varying the aerodynamic configuration and position of such airfoils in flight, as required for operational performance and/or specific conditions.

The mechanism of the present invention permits the use of auxiliary slat airfoil devices operative for lengthening of the wing chord, slat chord, wing camber, slat camber while assuring maintenance of proper aerodynamic relationships between the auxiliary airfoil and the main wing at all times without substantial voids in the leading edge of the wing.

Although various mechanisms have been evolved in the past to position slat devices, none have been acceptable for high performance aircraft. The most successful system employed to the present time comprises only an extension mechanism operative to drive or extend the associated slat down a system of tracks having a predetermined geometry, thus of course severely limiting slat configurations.

The presence of only an extension mechanism restricts the slat capability to that of increasing the wing chord and wing camber along a fixed geometry. This geometry can not be adjusted or varied without major modification to the wing itself. Further, such systems are incapable of effectively controlling the relationship of the slat to the fixed leading edge of the wing, and are not applicable to extremely thin, high-speed wings because of their bulk and the resultant large voids required in the leading edge of the wing. Since such systems are quasi-locking only, they may permit the slat to separate from the basic wing contour when aerodynamic forces are applied. Such systems, in addition, generally require rub strips to prevent galling of the fixed leading edge of the wing on extension and retraction.

These systems also generally require "stepping" in the extended position, thereby disrupting leading edge geometry at slat junctions. As a result, these slats are unable to obtain or maintain the optimum aerodynamic configuration for any given wing station. Additional limitations of such systems are their inoperability in tran-sonic (650+ m.p.h.) speeds because of inherent inability to fulfill aerodynamic requirements and withstand aerodynamic loading, thus significantly restricting maneuverability at tran-sonic speeds.

These and other undesirable limitations are obviated by employment of the unique mechanisms of the present invention.

The device of the present invention is operative to vary both the shape and geometric trajectory of a variable geometry airfoil, thus increasing wing camber and chord length.

Obviously, such a characteristic results in significant increases in lift of a supersonic wing at low speed, without adversely effecting intrinsic aerodynamic cleanliness and with a minimum of drag at high speed.

In addition, the device of the present invention has a degree of structural integrity permitting operation of the slat controlled by it at high (tran-sonic) speeds and during high speed maneuvers, the latter characteristic permitting high $g$ maneuvers free from the normally resultant buffeting caused by aerodynamic separation common in state-of-the-art devices.

It is therefor an object of the present invention to provide a means operable to selectively maintain optimum aerodynamic shape and position of auxiliary airfoil devices in all flight regimes.

Another object is to provide a system which is stable in any position throughout its operable range and which provides positive locking in the stowed and takeoff positions.

A still further object is to provide a slat activating system in which the most effective aerodynamic configuration is maintained at desired slat positions throughout extension and retraction cycles.

A yet further object is to provide such a system which is easy to maintain and service.

Other objects and advantages of the invention will become apparent from the following description when taken together with the drawings wherein:

FIGURE 3 is an elevational, cross-sectional view of the drive mechanism of the invention;

FIGURE 4 is an elevational, cross-sectional view of co-axial, concentric guide followers employed in the invention;

FIGURE 5 is illustrative of the geometry of the slat attitude positioner linkage of the invention;

FIGURE 6 illustrates the geometry of the slat nose rotation means;

FIGURE 7 shows the geometry of the I beam track and associated drive mechanism according to the present invention; and FIGURE 8 is a perspective, cut-away view of the slat nose rotation mechanism and the cooperative slat attitude positioner linkage for any one slat section.

Figure 1:
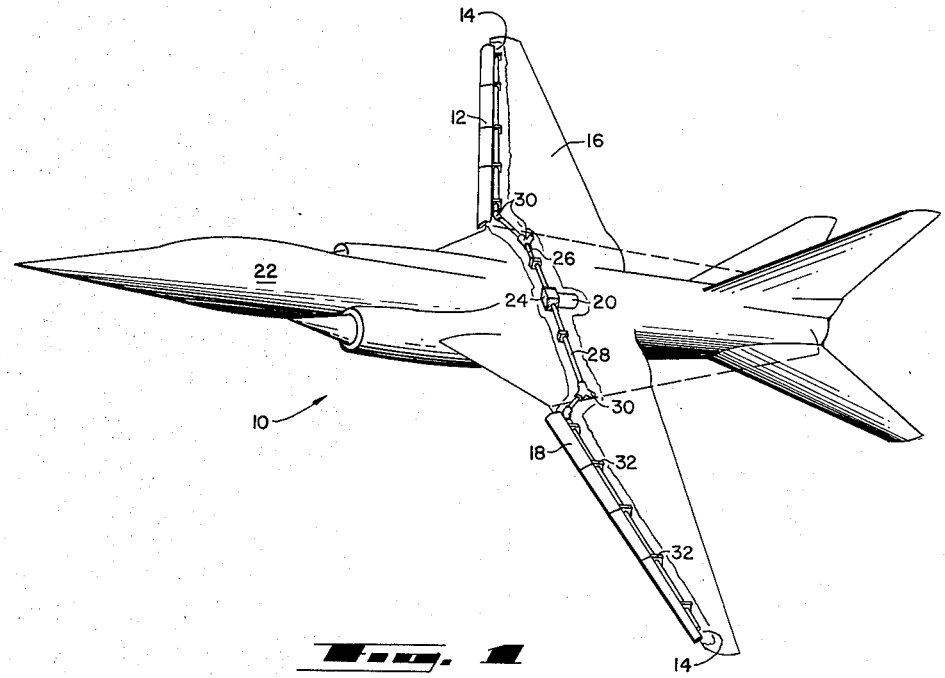
FIGURE 1 is an isometric view of one slat system and the drive mechanism of the invention shown in relation to the entire aircraft.

Referring now to the drawings, FIGURE 1 shows an aircraft 10 provided with slats 12 on the leading edge 14 of wings 16, slat 12 being in sections 18. Central hydraulic-electric motor 20 is located as appropriate within fuselage 22 of aircraft 10. The output shaft of motor 20 is coupled to reduction type gear box 24 in any known manner. Driven shafts 26 and 28 are attached, respectively, by means of flexible joints 30 to gear box 24. These drive shafts 26 and 28 extend into the fixed leading edge 14 of the wing 16 in front of, and adjacent to, the first spar. Drive shafts 26 and 28 may be introduced into the input shaft of a series of primary gear boxes 32, as for example by means of splines, not shown. Primary gear boxes 32 have attached to their output shaft secondary shaft 34 (see FIGURES 2 and 3), which couples track drive boxes 36 and trunnions 38, of which there are two for each slat section 18. It should be noted that this particular instance, section 18 has at its lateral extremities I-shaped tracks 40 with their associated drive mechanisms 50 and slat attitude positioner linkages 42. Further, a slat nose rotation mechanism 44 and another slat attitude positioner linkage 42 may be located between the two tracks 40. Each track drive box 36, see FIGURE 3, is mounted on oscillator trunnion 38 which is rotatably received within bearing blocks 46 and 48. Trunnion 38 contains pinion gear 50 supported by bearings 52 within the bearing blocks within trunnion 38.

Figure 2:
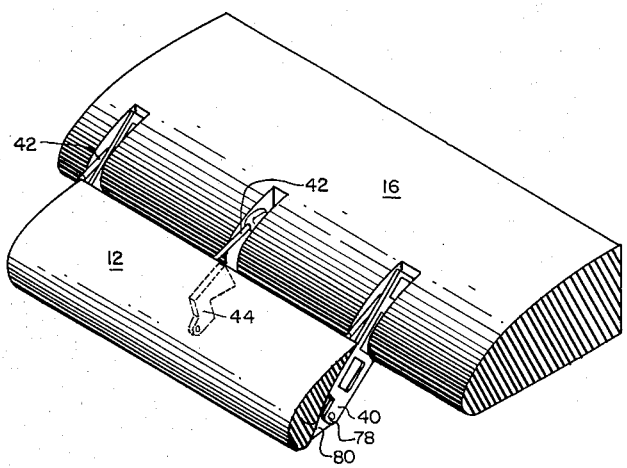
FIGURE 2 illustrates schematically the position of the major cooperative systems of the invention relative to the associated slat section.

Pinion gear 50 extends beyond the top of trunnion 38, and hence into track drive box 36. An I beam track 40 is slidably mounted within track drive box cavity 54. I beam track 40 has integral with the bottom of its lower flange 56 a rack 58 which is subsequently meshed with pinion gear 50. Track drive box 36 may have entrapped needle bearings (not shown) in the upper surface of track drive box cavity 54. Trunnion 38 which supports track drive box 36 and internal pinion gear 50 and its associated bearings is rotatably mounted within bearing blocks 46 and 48 affixed to two ribs 60 and 62 located within the fixed leading edge 14 of the wing 16 near the extremities of each slat section 18. In FIGURE 4, two concentric, co-axial rollers 64 and 66 are mounted on two trunnions 68 and 70 contained within bearing blocks 73 and 75 which are integral with the interface of aforementioned ribs 60 and 62 and aft of the track drive box 36. Rollers 64 and 66 are positioned within flanges 72 and 56 adjacent to web 74 of I beam track 40. I beam track 40, as illustrated in FIGURE 7, has pivotally mounted to its forward terminal 78 a fitting 80 attached to the lower surface, and near the forward extremity, of the fixed portion of slat 18 at a point immediately aft of the slats rotating nose 82. This provides a pivot point 84 for rotation of nose 82 in relation to the fixed portion of the slat 18. The slats rotating nose 82 is pivotally mounted to this aforementioned pivot point 84. The relationship of the mechanisms, as illustrated in FIGURE 2, insures proper cooperation as well as enhances structural integrity.

The slat attitude positioner linkages 42 (see FIGURE 5) are rotatably mounted to the lower surface and near the trailing edge of the slat 18 at one end by means of an adjustable rod end 86 contained within clevis type fitting 88. The opposite end of the slat attitude positioner linkage 42 is suitably slooted at 90 and mounted over trunnion 92 or over trunnion 38 (see FIGURES 3 and 5) to which track drive box 36 is attached. Slat attitude positioner linkage 42 is restrained by means of an integral shoulder 94, in bearing block 46 and cam 96, as well as by integral shoulder 98 in trunnion 38. At midpoint along the shank of linkage 42 roller type cam follower 100 is rotatably attached, and subsequently positioned within cam 96. Cam 96 is an integral portion of track drive box trunnion bearing block 46 when the slat attitude positioner linkage 42 is located at the slat extremities near the tracks 40, see FIGURE 3.

Strategically located along the span of slat 12 or sections 18 and rotating nose 82 and between tracks 40 is located the slat nose rotation mechanism 44 (see FIGURES 6 and 7). This mechanism is contained within housing 102, see FIGURE 8, which is attached to the lower surface 104 of the fixed portion of slat 18. The forward portion of housing 102 has an extension 106, similar in function to fitting 80, in that rotating nose 82 is pivotally mounted thereto. Push-pull actuating rod 108 of slat nose rotating mechanism 44 is attached at one extremity to clevis type fitting 110 which is attached to slat nose spar 112. The opposite end of push-pull actuating rod 108 is attached to a clevis on bell crank shaft 114. Spring loaded cartridge 116 is attached at one end to fixed lug 118 which is an appendage of mechanism housing 102. The opposite end of cartridge 116 is attached to a second clevis 120 of bell crank shaft 114. Splined shaft 122 is rotatably mounted in bearings contained in the housing 102 and connects bell crank shaft 114 with external roller crank 124. External bell crank 124 has attached to each of its arms cam rollers 126 and 128 respectively. Two ribs 130 and 132 are located in the fixed wing leading edge 14 enclosing nose rotation mecahnism 44. Located upon the interface of rib 130 is affixed adjustable tripping cam 134 for engagement of cam rollers 126 and 128. Unlike the trunnion to which track drive boxes 36 are attached, shouldered trunnion 92 is not rotatably mounted to rib 132. The centrally located slat attitude positioner linkage 42 is supported by and attached to trunnion 92. This slat attitude positionerd linkage is similar to the hereinabove described linkages, except that clevis 88 is in this case integral with the housing 102.

Referring now to FIGURES 7 and 8, which illustrate the track extension mechanism, the track and slats are shown in solid lines in the stowed (40a), phantomed in the loiter (40b) and the take-off (40c) (FIGURE 7) positions. As previously set out, motor 20 provides rotary power to reduction type gear box 24 to which are connected two drive shafts 26 and 28. The power is then transmitted to the outer portion of drive shafts 26 and 28 via universal joints 30. In the interest of simplicity, only one of the slat sections 18 will be described in operation since all are identical in function reference being made to FIGURES 3, 7 and 8. Drive shaft 26 transmits rotary motion to secondary drive shaft 34 by means of gear box 32 of which there is one for each slat section. Secondary drive shaft 34 has coupled to it, by splined shafts at each extremity, a cooperating pinion gear 50 mounted in bearings 52 within the trunnions 38 to which two track drive boxes 36 are attached. This assures constant pinion gear speed at each of the track drive boxes.

A "roll-off" effect is necessary if proper leading edge geometry is to be maintained during extension and retraction of the slat sections. This is accomplished by varying the diameter of pinion gear 50, thus producing properly controlled differential extension and retraction speeds at each track drive box 36. Pinion gear 50 is located concentrically within trunnion 52 of each track drive box 36. A portion of the addendum circle of each pinion penetrates the upper portion of the trunnion 52. The attachment of track drive box 36 to trunnion 52 creates cavity 54 which slidably receives I beam track 40. An integral rack 58, located on the bottom of lower flange 56 of I beam track 40, is subsequently meshed with pinion gear 50 protruding from the lower cavity floor. Subsequently, the driven pinion gear's rotation imparts lateral movement to I beam track 40 which is encased within cavity 54 in accordance with the gear's speed and direction. The tolerances between I beam track 40 and track drive box 36 are slight, and frictional drag may be reduced by chroming the contacting parts and lubricating them with a suitable lubricant such as molybdenum disulfide-boric oxide. Another means of reducing friction would require properly lubricated entrapped needle bearings within the ceiling of track drive box 36 adjacent cavity 54 and rotatably contacting upper flange of I beam track 40. Track drive box 36 is rotatably mounted within two bearing blocks 46 and 48 which are subsequently attached to ribs 60 and 62. Proper track 40 and pinion 50 relationship is assured during extension and retraction by allowing track drive box 36 and associated trunnion 38 to oscillate about pinion 50 and secondary shaft 34. As track 40 is propelled through track drive box 36 by pinion 50, slat mounting point 136 (see FIGURE 7) at the forward end of track 40 moves through a predetermined path. This path is produced by the shape of the aft end of track 40 which is guided and restrained by contact with two adjustable co-axial concentric rollers 64 and 66 in conjunction with drive box cavity 54 in track drive box 36. Track 40 may be propelled to any desired point throughout the thus established predetermined path.

Slat 18 and rotating nose 82, being pivotally attached to the aforementioned slat mounting point 136 on track 40 is propelled to the extended position and retracted by virtue of the relationship of pinion 50, track 40 and the slat 18. Correct attitude of slat 18 and nose 82 is produced by slat attitude positioner linkage 42, see FIGURE 5. As hereinabove described, slat attitude positioner linkage 42 is attached to clevis 88 located near the trailing edge and on the lower side of the fixed portion of slat 18. The attitude of slat 18 and nose 82 is controlled by the relative position of the aforementioned roller cam follower 100 within its associated cam 96. As the slat is propelled by the track drive mechanism, slat attitude positioner linkage 42 and its roller cam follower 100 are trailed within a path described by cam 96. The differential in distance between the mounting point of linkage 42 on slat 18 and the axis of trunnion 38, fixed relative to leading edge 14, is determined by the desired attitude of slat 18 and controlled by the geometrics of cam 96. This distance differential is provided for by slot 90 in the end of linkage 42 which encompasses trunnion 92.

FIGURE 6 shows the slat nose rotation mechanism 44. Slat nose rotation is produced at desired points along the path of the slat during extension and retraction by slat nose rotation mechanism 44. With slat 18 and rotating nose 82 in the stowed position, slat nose 82 is assumed to be at a zero degree attitude in relation to the trailing portion of slat 18. Slat nose 82 is held and locked in the stowed (retracted) position by push-pull actuator rod 108. Push-pull actuator rod 108 is subsequently attached to clevis fitting 110 on slat nose spar 112 at one extremity while the opposite extremity is attached to one of two clevis type arms 138 of bell crank shaft 114. A positive lock is achieved on slat nose 82 at this position by an over center condition induced by the delineation and relationship of points A, B and C, see FIGURE 6, controlled by stop bolt 140. A locking moment is produced by spring cartridge 116 attached at one end to clevis 120 of bell crank shaft 114 in a position relative to bell crank center 142 while the other end is received by integral lug 118 on housing 102, consequently restraining bell crank 114 in the over center position.

As track 40 propels slat 18 and slat nose 82 toward the loiter position 40b, the angular relationship between slat nose 82 and slat 18 remains at zero degrees until the cam roller 128 of external cam roller crank 124 enters tripping cam 134. As slat 18 and nose 82 continue on toward the loiter position, rotation is imparted to bell crank shaft 114 by virtue of its cooperation with cam roller crank 124 contact of cam roller 128 against the wall of tripping cam 134, thus opening the over center lock. As slat 18 and nose 82 begin to "drop" due to the configuration of the aft portion of track 40, cam roller 128 travels down within tripping cam 134 until the bottom or pocket is reached while the forward movement of the slat in relation to cam roller 128 has produced sufficient rotational movement to rotate nose 82 into the proper angular attitude for the loiter position "b." Further, at this time all other mechanisms have simultaneously attained the proper attitude to achieve the loiter position.

With the slat system static relative to fixed wing leading edge 14, any external moment due to aerodynamic forces on slat nose 82 is reacted through push-pull actuator rod 108, bell crank 114, and cam roller 128 and crank 124 to tripping cam 134. As the slat system is again set in motion to achieve the take-off position 18c, cam roller 128 will continue along a path prescribed by tripping cam 134. Since the path taken by bell crank shaft 114 and the path taken by cam roller 128 are different by virtue of cam roller 128 being momentarily static, rotation is thus imparted to shaft 114, thus rotating it through a 180 degree arc which results in its passage over entrapped cam roller 128. As this "flipping" of cam roller crank 124 is completed, the forward and downward movement of slat nose 82 will tend to draw roller 128 from the pocket in cam 96 to a point which will allow additional rotation of crank 124 sufficient to produce further rotational motion of shaft 114, consequently bell crank shaft 114 will turn until the slat nose 82 assumes the proper angular relationship (82c) for the take-off position. Again, an over center locking condition is achieved between the same points A', B' and C' as obtained in points A, B and C, and again spring cartridge 116 produces locking moment. Cam roller 126 serves the function of maintaining the correct trailing attitude of roller 128 in tripping cam 134 and is partially responsible for insuring engagement with the aforementioned cam. The engagement of roller 128 with tripping cam 134 is further assured by another slat attitude positioner linkage 42 placed immediately adjacent to nose slat rotation mechanism housing 102, as shown in FIGURE 7. This slat attitude position linkage is identical to the previously described linkages in operation and construction with one exception, this being shouldered trunnion 92 over which slotted end 90 is placed. This trunnion is merely attached to rib 132 and does not rotate or serve any other function. The operation above has been described generally in the stowed to take-off sequence. It is obviously understood that the system is reversible.

Having thus described this invention, what is claimed as new and what is desired to secure by Letters Patent of the United States is:

1. Means for selectively controlling the aerodynamic characteristics of a variable high-lift device incorporated with a wing leading edge, comprising in combination:
    (A) first support means operative to selectively extend and retract said high-lift device relative to a wing leading edge,
        said means having substantial structural integrity to assure the trajectory of said high-lift device through a predetermined path which increases or decreases the theoretical chord and camber of the wing;
    (B) second means cooperative with said first means operative to vary and control the attitude of a trailing portion of said high-lift device relative to the leading edge of said wing throughout the operative trajectory of said high-lift device; and
    (C) third means operative with said first and second means to cooperatively rotate the leading portion of said high-lift device relative to the trailing portion on extension or retraction of the body thereof.

2. A mechanism operable to incrementally position variable geometry aerodynamic high-lift devices comprising in combination:
    (A) a first extension means for propelling said high-lift device away from an airfoil leading edge,
        (1) said first extension means comprising driving means rotatably mounted on a first support means affixed within said airfoil leading edge;
        (2) said first support means positioning second support means oscillatable about said first support means;
        (3) said second support means defining a cavity operable to receive therewithin, and permissive of lateral movement of, a beam-like support extending and retracting means;
        (4) said driving means extended into said cavity and engaging a cooperative portion of said beam-like support extending and retracting means operative to cooperate with said driving means in effecting lateral extension and retraction of said beam-like support means;
        (5) said beam-like support means operable to cause said high-left device operatively associated therewith to describe a predetermined geometric trajectory relative to the airfoil leading edge;

(6) said last named means having a terminal appendage at the outermost extremity thereof for rotatably receiving a terminal fitting attached to the leading portion of said high-lift device and partially supporting the trailing portion of said high-lift device;

(B) second extension means cooperative with said first extension means operative to vary the position of said trailing portion of said high-lift device relative to said airfoil leading edge,
  (1) said means comprising first support means affixed within said airfoil leading edge and having a positioner means rotatably mounted thereon;
  (2) said positioner means having an enlarged lower extremity in rotatable operative relationship with said first support means;
  (3) said enlarged extremity defining means operative to permit lateral movement of said positioner means about said first support means;
  (4) said positioner means having a cam responsive means thereon in operative relationship with a camming means of predetermined, fixed geometrical configuration fixedly attached within said airfoil leading edge;
  (5) said positioner means received at the upper extermity thereof within said trailing portion of said high-lift device;

(C) means in cooperative relationship with said first and second extension means operative to rotate the leading portion of said high-lift device relative to said trailing portion of said high-lift device,
  (1) said cooperative means comprising an upper and lower linkage receiving means operatively associated with said high-lift device leading portion;
  (2) said lower linkage receiving means movably attached to a linkage housing, said housing affixed to the lower surface of the trailing portion of said high-lift device;
  (3) said housing comprising, in part, means for receiving the positioning linkage at one end thereof;
  (4) said upper linkage receiving means cooperatively receiving a push-pull actuator rod located at least partially within said linkage housing and having a means on the part thereof within said housing for attachment to a rotatable shaft,
  (5) said shaft rotatably mounted within said linkage housing and operatively connected to a load biasing means,
  (6) said biasing means also affixed to the forward extremity of said linkage housing;
  (7) said shaft extended through at least one wall of said housing and having thereon means for driving said push-pull activator selectively forward or backward to thereby alter the physical relationship of said leading portion relative to said trailing portion of said high-lift device to thus vary the chord and camber thereof.

3. A mechanism operable to incrementally provide varying aerodynamic configuration and position of an auxiliary high-lift airfoil device, comprising in combination:

(A) first extension means operative to cause said high-lift device to assume a predetermined position and relationship relative to the lead edge of an associated wing section,
  (1) said means comprising driven pinion gears rotatably mounted within trunnions and extending into associated track drive boxes;
  (2) said trunnions supporting track drive boxes oscillatable about said trunnions,
  (3) said track drive boxes defining therewithin a cavity to receive and permit limited lateral movement of an I-beam track extending and retracting means;
  (4) said pinion gears engaging a rack integral with the lower flange of said I-beam track;
  (5) said I-beam being of irregular configuration operative to induce a specific geometric trajectory to the means guided thereby during extension and retraction;
  (6) said track having means integral therewith for rotatably receiving a clevis fitting rotatably attached to the leading edge portion of said high-lift device and supporting in part the trailing portion thereof;

(B) second extension means cooperative with said first extension means operative to cause the trailing portion of said high-lift device to assume a predetermined position and relationship relative to the leading edge of the associated wing section;
  (1) said extension means comprising a trunnion affixed within the leading edge of said wing section, said trunnion having a positioner linkage rotatably mounted thereon;
  (2) said linkage having an enlarged lower extremity for slidably embracing engaging said trunnion, said extremity having an elongated aperture therein;
  (3) a circular cam follower rotatably attached to said linkage between the upper and lower extremities thereof;
  (4) a cam track affixed within the leading edge of said wing section and slidably embracingly receiving said cam follower;
  (5) said linkage rotatably received at the extremity opposite said enlarged extremity within a clevis attached to the trailing portion of said high-lift device;

(C) a leading edge rotating mechanism cooperative with said first and second extension means operative to impart to the leading edge of said high-lift device a rotational movement relative to the trailing portion thereof to effectively vary the chord and camber of said high-lift device, said rotating mechanism comprising;
  (1) a clevis fitting having first and second receptacle means secured to the leading portion of said auxiliary high-lift device;
  (2) a linkage housing extension rotatably received in said fitting first receptacle means;
  (3) a push-pull actuator rod rotatably received in said fitting second receptacle means and extended beyond said housing;
  (4) said linkage housing attached to the trailing portion of said auxiliary high-lift device and having a clevis rotatably receiving said positioner linkage;
  (5) said actuator rod having an adjustable C-shaped rod and thereon received in a first integral clevis means;
  (6) said clevis integrally mounted on a rotatable bell crank shaft secured within bearings on opposed sides of said housing;
  (7) said shaft provided with second clevis means thereon, said second clevis being rotated 90° in position on said shaft from said first clevis,
  (8) said second clevis rotatably receiving one end of a spring-loaded cartridge biasing device;
  (9) said biasing device attached at the extremity furthest removed from said clevis to the forward portion of said housing, said cartridge and said push-pull actuator rod bearing a substantially parallel relationship to each other;
  (10) said bell crank shaft extended through one wall of said housing and having a bell crank on said extended end operative to impart rotational movement to said bell crank shaft and opposed forward and backward movement to said biasing device and said actuator rod to thereby vary the position of said leading portion of said auxiliary high-lift device;
(11) said bell crank having a cam follower roller rotatably positioned on each arm;
(12) said cam follower rollers engageable with a cooperative trip cam affixed within the leading edge of said associated wing section operative to impart rotational movement to said bell crank shaft.

No references cited.

MILTON BUCHLER, *Primary Examiner.*

B. BELKIN, *Assistant Examiner.*